United States Patent
Lin et al.

(10) Patent No.: US 8,122,241 B2
(45) Date of Patent: Feb. 21, 2012

(54) METHOD FOR DELIVERING A CONFIDENTIAL E-MAIL

(75) Inventors: Chun-Te Lin, Taipei (TW); Yi-Hung Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 1009 days.

(21) Appl. No.: 11/826,704

(22) Filed: Jul. 18, 2007

(65) Prior Publication Data
US 2008/0109658 A1 May 8, 2008

(30) Foreign Application Priority Data
Nov. 2, 2006 (TW) .................. 95140614 A

(51) Int. Cl.
*H04L 29/06* (2006.01)
(52) U.S. Cl. ................ 713/152; 713/151; 713/150
(58) Field of Classification Search .............. 713/152, 713/151, 150
See application file for complete search history.

(56) References Cited

U.S. PATENT DOCUMENTS
2002/0143710 A1   10/2002   Liu

FOREIGN PATENT DOCUMENTS
CN   1722710 A   1/2006

OTHER PUBLICATIONS

ITS (Password Protect Microsoft Word and Excel Documents, ITS Help Desk helpdesk@uwo.ca Last updated: May 8, 2003).*
An Empirical Study of Spam and Spam Vulnerable email Accounts; Dhinakaran, C.; Jae Kwang Lee; Nagamalai, D.; Future Generation Communication and Networking (FGCN 2007); vol. 1; Publication Year: 2007, pp. 408-413.*
A Survey on Text Classification Techniques for E-mail Filtering ; Upasana; Chakravarty, S.; Machine Learning and Computing (ICMLC), 2010 Second International Conference on; Publication Year: 2010 , pp. 32-36.*
Secure and resilient peer-to-peer e-mail design and implementation; Kangasharju, J.; Ross, K.W.; Turner, D.A.; Peer-to-Peer Computing, 2003. (P2P 2003). Proceedings. Third International Conference on; Publication Year: 2003 , pp. 184-191.*

* cited by examiner

*Primary Examiner* — David Y Jung
(74) *Attorney, Agent, or Firm* — Rabin & Berdo, P.C.

(57) ABSTRACT

A method for delivering a confidential e-mail is disclosed. The application software loads a first e-mail, checks if an attached file of the first e-mail is encrypted, opens a second e-mail for delivering a password of the attached file when the attached file is encrypted, and loads at least one receiver of the first e-mail to the second e-mail for sending the second e-mail.

9 Claims, 2 Drawing Sheets

METHOD FOR DELIVERING A CONFIDENTIAL E-MAIL

RELATED APPLICATIONS

This application claims priority to Taiwan Application Serial Number 95140614, filed Nov. 2, 2006, which is herein incorporated by reference.

BACKGROUND

1. Field of Invention

The present invention relates to a method for delivering a confidential e-mail. More particularly, the present invention relates to a method for delivering a confidential e-mail in a specific local network area.

2. Description of Related Art

Information security is becoming increasingly important. According to the Forrester Research 2005, 25% of employees outgoing e-mails carry confidential messages of their companies, and 35% of companies doubt if their employees emails contain confidential messages. Therefore, companies should govern outgoing e-mails more carefully.

Additionally, the employees can let out confidential messages easier by sending an e-mail with an attached file which contain business secrets. If such e-mails are intercepted on purpose, the situation might get worse.

For the forgoing reasons, there is a need for a new delivery method, which ensures the security of the confidential message carried by e-mails with attached files.

SUMMARY

According to one embodiment of the present invention, a method for delivering a confidential e-mail is disclosed. The e-mail application software loads a first e-mail, checks if an attached file of the first e-mail is encrypted, edits a second e-mail for delivering a password of the attached file when the attached file is encrypted, and loads at least one receiver of the first e-mail to the second e-mail for sending the second e-mail.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
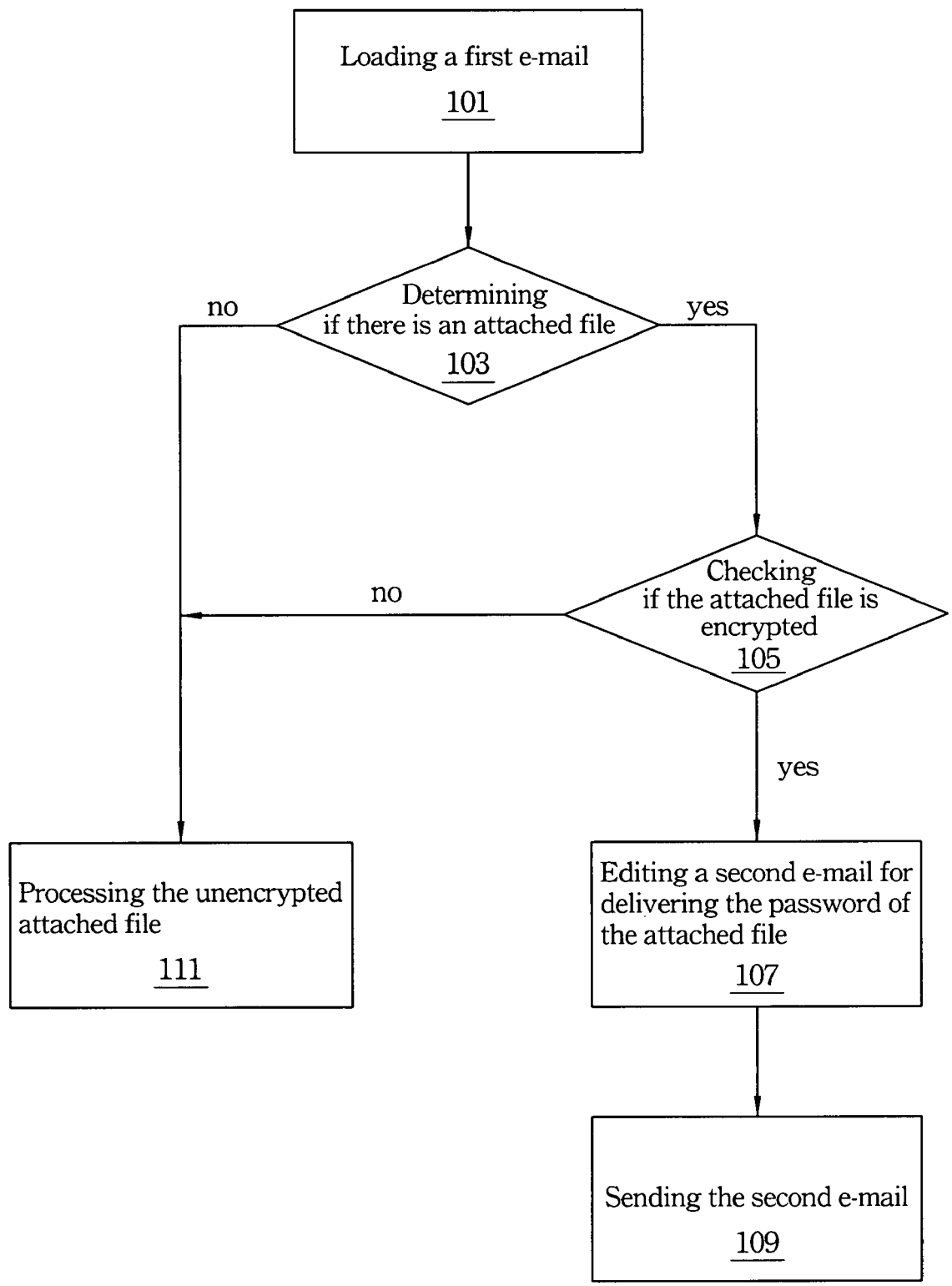
FIG. 1 is the flow chart of the method for delivering a confidential e-mail according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is the flow chart of the method for delivering a confidential e-mail according to one embodiment of the present invention. The method for delivering a confidential e-mail is performed by e-mail application software, the outlook express for example. The method includes: the loading step 101 for loading the first e-mail, the determining step 103 for determining if there is an attached file, the checking step 105 for checking if the attached file is encrypted, the editing step 107 for editing the second e-mail, the sending step 109 for sending the second e-mail, and the process step 111 for processing the unencrypted attached file.

When a user uses e-mail application software for sending a first e-mail, the e-mail application software loads the first e-mail in step 101, then determines if the first e-mail contains an attached file in step 103. If the first e-mail contains an attached file, the attached file is checked if it is encrypted in step 105.

If the attached file is encrypted, the e-mail application software sends the first e-mail with the attached file first, and starts a second e-mail which enables the user to deliver the password of the attached file in step 107. The second e-mail loads at least one receiver recorded in the first e-mail automatically. After step 107, the e-mail application software sends the second e-mail for delivering the password of the attached file in step 109. In other words, the attached file and its password are delivered separately. Therefore, the attached file cannot be opened immediately if it is intercepted.

The e-mail application software continues to perform the step 111 if it finds that the attached file is not encrypted (in step 105). In step 111, there are various ways for processing the unencrypted attached file. One way is sending the unencrypted attached file directly while the business message carried with the attached file is not that important.

Another way is requiring the user to encrypt the unencrypted attached file, and continue performing step 107 and the remaining steps for delivering the first e-mail with the attached file and the second e-mail with the password only after the attached file is encrypted. This way is appropriate for the attached file with important business message, for example, proposals, schedules, and product designs. In addition, the e-mail application software can also finish without sending any e-mails, which forces the user to encrypt the attached file if he or she wants to send out the attached file.

Figure 2:
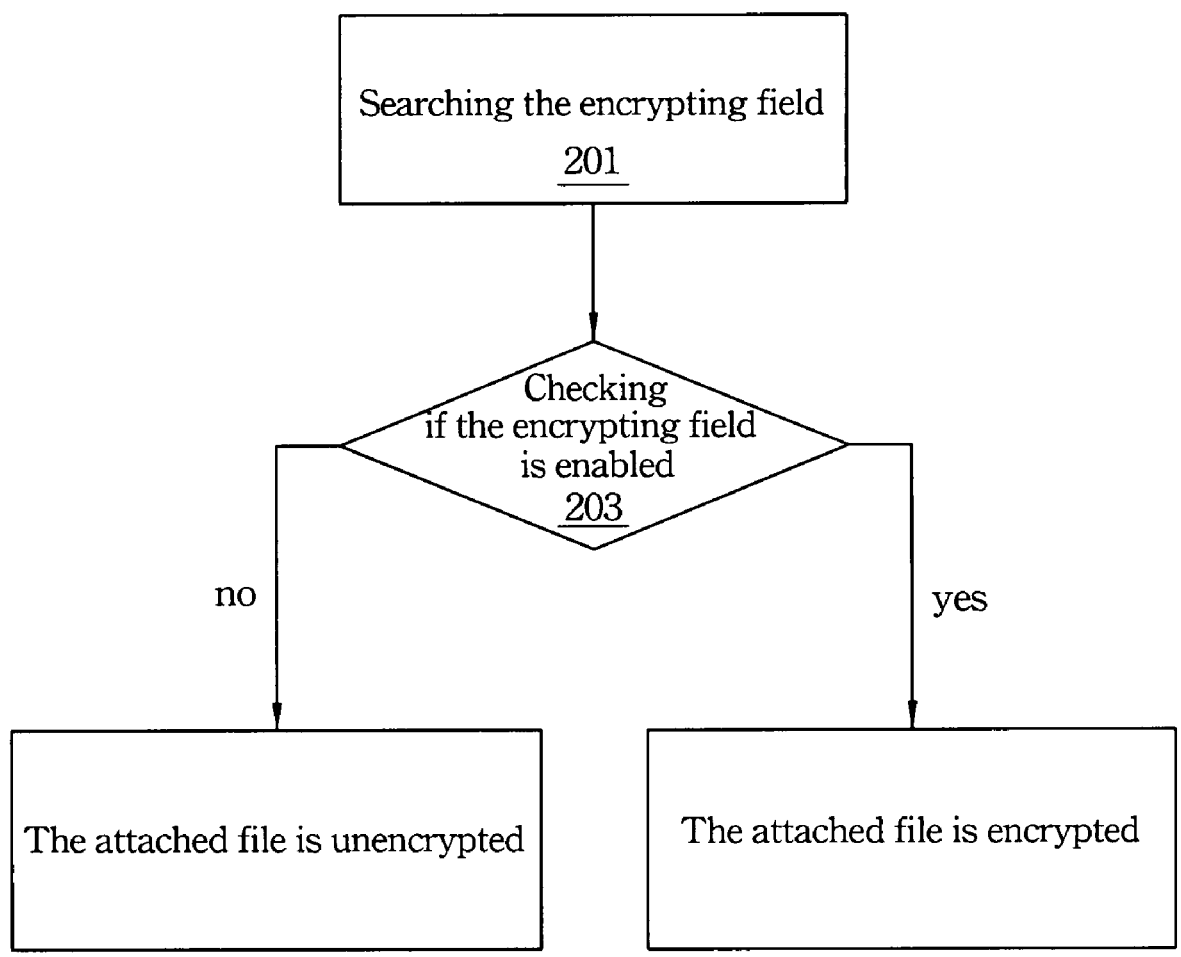
FIG. 2 shows the detail steps for determining if the attached file is encrypted according to one embodiment of the present invention.

FIG. 2 shows the detailed steps of the checking step 105 according to one embodiment of the present invention. While checking if the attached file is encrypted, the e-mail application software first performs step 201 for searching the corresponding encrypting field according to the format of the attached file. For example, the e-mail application software searches the corresponding encrypting fields of the word file, the powerpoint, the video file, and the excel file, respectively.

After step 201, the e-mail application software determines if the encrypting field is enabled in step 203. If the encrypting field is enabled, which represents the attached file is encrypted, the e-mail application software goes on performing the step 107 for editing the second e-mail and the remaining steps. On the contrary, if the encrypting fields are not enabled, which represents the attached file is not encrypted, the e-mail application software performs the step 111 for processing the unencrypted attached file.

According to above the embodiment of the present invention, the method for delivering a confidential e-mail reminds users to encrypt the attached files of the e-mails, and delivering the attached file and the password of the attached file separately, which reduce possibility of letting out the business secrets. In addition, the receivers are loaded automatically for sending the password, which facilities the mail sending process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for delivering a confidential e-mail performed on a personal computer in a local network area, comprising:
   loading, in the personal computer, a first e-mail by an e-mail application software;
   checking, in the personal computer, if an attached file of the first e-mail is encrypted; and
   editing, in the personal computer, a second e-mail for delivering a password of the attached file when the attached file is encrypted, and loading, in the personal computer, at least one receiver recorded in the first e-mail automatically to the second e-mail for sending the second e-mail.

2. The method of claim 1, further comprising sending the first e-mail with the attached file if the attached file is encrypted.

3. The method of claim 1, further comprising sending the first e-mail with the attached file if the attached file is not encrypted.

4. The method of claim 1, further comprising requiring encrypting the attached file when the attached file is not encrypted.

5. The method of claim 1, further comprising finishing the e-mail application software when the attached file is not encrypted.

6. The method of claim 1, further comprising:
   searching an encrypting field according to the format of the attached file; and
   determining if the encrypting field is enabled.

7. The method of claim 6, wherein the attached file is encrypted when the encrypting field is enabled.

8. The method of claim 1, wherein the attached file is a text file.

9. The method of claim 1, wherein the attached file is a video file.

* * * * *